June 9, 1942.                F. E. BEST                2,285,405
                         DYNAMIC RECTIFIER
                      Filed Sept. 30, 1940          2 Sheets-Sheet 1

Frank Ellison Best.
INVENTOR.

June 9, 1942.  F. E. BEST  2,285,405
DYNAMIC RECTIFIER
Filed Sept. 30, 1940  2 Sheets-Sheet 2

Frank Ellison Best,
INVENTOR.

Patented June 9, 1942

2,285,405

UNITED STATES PATENT OFFICE 2,285,405

DYNAMIC RECTIFIER

Frank Ellison Best, Indianapolis, Ind.

Application September 30, 1940, Serial No. 359,055

13 Claims. (Cl. 74—573)

This invention relates to means for and a method of dynamically balancing or rectifying rotatable machine-parts.

In my prior patent application Serial No. 169,682, filed October 18, 1937, re-filed September 25, 1940, Serial No. 358,323, and in my prior patent application Serial No. 284,494, filed July 14, 1939, I disclose a means for and method of accomplishing a similar purpose.

An object of this invention is to provide a rotary machine part having therein a material which is rigid and non-yielding at normal operating temperatures but is capable of being softened or fused by the application of heat to render it yielding and permit dynamic rectification or balancing of the part.

Another object is to provide a method of dynamically balancing a rotary machine structure which comprises forming said structure of a plurality of relatively adjustable parts, connecting the relatively adjustable parts by permanently deformable means held rigid and non-deformable at normal operating temperatures by heat fusible material and dynamically balancing the structure by rapidly rotating the same under properly controlled vibration conditions to rectify dynamic balance by deformation of said deformable material while maintaining the heat fusible material in a softened or fused condition by the application of heat.

Another object of this invention is to provide a rotary machine part which is dynamically balanced by rotating it for a substantial period of time at a speed at which the vibrations of the rotating machine part, due to dynamic unbalance, are dampened and substantially neutralized by the reactive vibrations of the supporting means for said machine part.

If a rotatable machine part which is dynamically unbalanced is mounted in a bearing and supporting stator means and rotated it will tend to vibrate or oscillate and the vibrations or oscillations thereof will be communicated to the bearing and supporting stator means, which have a natural period of vibration, while the period f vibration of the dynamically unbalanced rotating machine part will vary in proportion with the speed of rotation thereof. As the machine part is rotated at varying speeds the period of vibration thereof for certain speeds will be in consonance with the vibrations of the bearing support and the amplitude of the vibrations will be increased while for certain other speeds of rotation the vibrations of the rotating machine part will be in dissonance to the vibration of the bearing and support therefor and the vibrations of the rotating part will be dampened and counteracted and substantially neutralized by the vibrations of the bearing and stator support. The vibrations of the rotating part and the stator support may be likened to sound waves in that they may reinforce each other or may substantially neutralize each other, the periods at which they tend to neutralize each other being likened to the nodes in resonance. At speeds at which the vibrations of the rotating body and the support therefor oppose each other, forces are set up which produce hammering stresses between the two parts that are not manifested externally.

It is an object of this invention to utilize the hammering stresses set up in a multiple part rotatable machine structure by these opposing forces, at speeds of rotation corresponding to the dissonance or node periods, to deform permanently deformable means in the rotatable machine structure and bring about a state of dynamic balance at a time when heat responsive material that normally prevents deformation of the permanently deformable means is rendered soft and yieldable by the application of heat.

It is another object of this invention to provide a rotatable machine part, having embodied therein and connecting two parts of the same, two different materials, one of which permanently unites the two parts under normal temperatures but is capable of being softened by heat to render it yielding and the other of which is permanently deformable by hammering action so that when the first mentioned material is rendered soft by the application of heat the permanently deformable parts will undergo permanent deformation and provide for a shifting of the dynamic center in response to the joint application of heat and the rotation of said machine part, in a bearing and supporting means which has a natural period of vibration of its own, at a speed at which the vibrations due to dynamic unbalance in the rotating machine part are opposed by the vibrations set up in the bearing and supporting means.

Other objects of the invention are to provide a dynamic balancing or rectifying means and method that are especially well adapted for use in structures that operate at excessively high speeds and that will permit of a succession of balancing operations each for a higher speed than the preceding one, and further to provide such a means and method that are simple and efficient and do not require expensive construction.

Other objects will be apparent from the following description taken in connection with the accompanying drawings.

In the drawings

Figure 1:
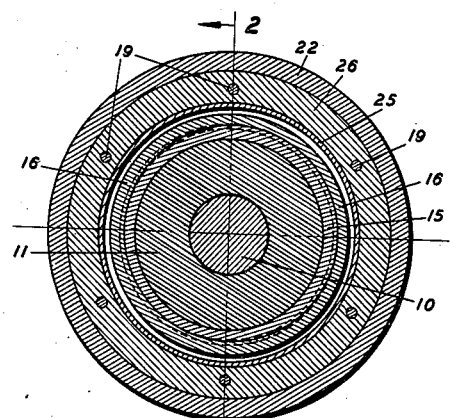
Figure 1 is a cross section, taken substantially on broken line 1—1 of Fig. 2, showing a dynamic rectifying means constructed in accordance with this invention.

Certain bearings are indicated somewhat diagrammatically in all of the views.

Like reference numerals designate like parts throughout the several views.

Figure 2:
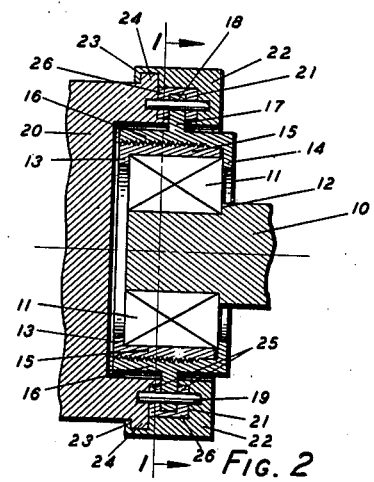
Fig. 2 is a longitudinal medial section, taken substantially on broken line 2—2 of Fig. 1, parts being broken away.

Referring to Figs. 1 and 2 I show a dynamic rectifier comprising a stator member 10 supporting bearing means 11 that is held longitudinally between a shoulder 12 on said stator and two other shoulders 13 and 14 on an inner cylindrical race member 15 and an outer cylindrical sleeve 16 respectively. Preferably the sleeve 16 is threaded onto the race member 15 to facilitate assembly and these two parts are thus rigidly secured together so that they operate as one piece.

The sleeve member 16 is provided with an outwardly extending annular flange 17 having a plurality of holes 18 for the reception of permanently deformable members 19. The permanently deformable members 19 may be of different forms but are herein illustrated as dowel pins. They are formed of a material, such as lead, copper, soft steel or the like that is capable of being permanently deformed by the hammering action of vibrations produced by the rapid rotation of the rotor and reacting against the natural vibrations of the stator. The term "permanently deformable," as herein used, means a material that is capable of having its shape changed by hammering action to provide improved dynamic balance and of retaining, at least temporarily, the changed shape.

The flange 17 is positioned within a recess 21 in an outer rotor member formed of a main rotor part 20 and an end cap 22. The permanently deformable members 19 have their end portions embedded in the rotor parts 20 and 22 and their medial portions extending through the holes 18 in the flange 17. The deformable members 19 fit tightly within the parts 17, 20 and 22 so that there will be no lost motion between these several parts.

The end cap 22 is preferably secured to the rotor member 20 by crimping an end portion 23 of said cap over an outwardly directed flange 24 on the end of the rotor member 20.

The recess 21, provided in rotor parts 20 and 22, has a narrower entrance portion formed by lips or flange members 25 of parts 20 and 22 and said recess is expanded or widened peripheryward from the flange members 25. The flange members 25 contact the sides of the radial flange 17 and support and align the several rotor parts while permitting radial adjustment therebetween for the purpose of dynamic balancing.

The recess 21 is filled with a heat fusible material such as a metal or alloy 26 that has a melting point higher than any temperature that will be attained in normal operation of the rotor and bearing means but low enough so that this metal can be softened or fused by the external application of heat without damage to any of the parts of the rotor or stator or bearing. One metal suitable for this use is commercially known as "Woods alloy" or "Woods metal." This metal is an alloy composed of bismuth fifty percent, lead twenty-five percent, tin twelve and one-half percent and cadmium twelve and one-half percent. Obviously various other heat fusible metals or alloys may be used. At normal operating temperatures this heat fusible metal is rigid and supports the several parts of the rotor in relatively rigid relation. In this way it also supports the permanently deformable members 19 and holds them rigid and non-deformable. When this fusible material is softened or fused by the external application of heat, preferably to the rotor part 22, the deformable members will be free to be deformed by vibration so as to provide improved dynamic balance and this improved condition of dynamic balance will be permanently retained when the heat fusible material is cooled and has set.

Figure 3:
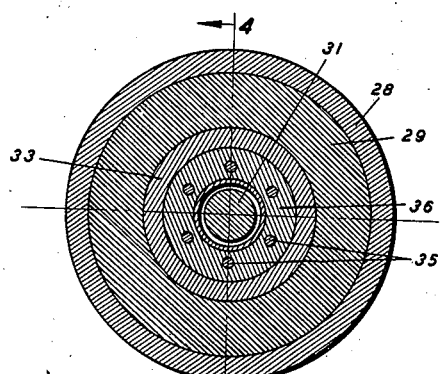
Fig. 3 is a cross section, taken substantially on broken line 3—3 of Fig. 4, showing a different form of this dynamic rectifying means.
Figure 4:
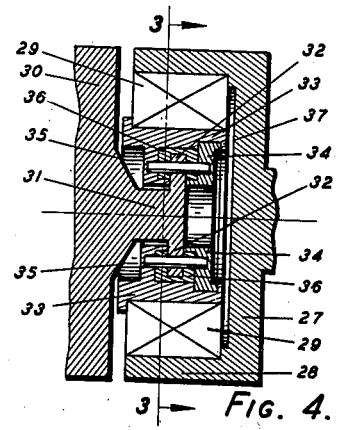
Fig. 4 is a longitudinal medial section, taken substantially on broken line 4—4 of Fig. 3, parts being broken away.

Figs. 3 and 4 show another form of the invention in which the stator and bearing are external to the rotor. In these figures, 27 is a stator having a cylindrical race member 28 for cooperation with suitable antifriction bearing means 29.

The rotor, Figs. 3 and 4 comprises a main rotor body 30 having an axial shank 31 on an end thereof. The shank 31 is provided with an outwardly extending annular flange 32 positioned in a recess in an outer rotor member formed of parts 33 and 34. The flange 32 is connected with the parts 33 and 34 by permanently deformable members 35 and heat fusible material 36. The recess in the parts 33 and 34 is substantially the same in shape and purpose and function as the recess 21 of Figs. 1 and 2. The two parts 33 and 34 are held in assembled relation by clinching the edge portion 37 of part 33 over the part 34.

In the structures of both Fig. 2 and Fig. 4 the dynamic rectifying means is substantially in the medial plane of the bearing means.

Figure 5:
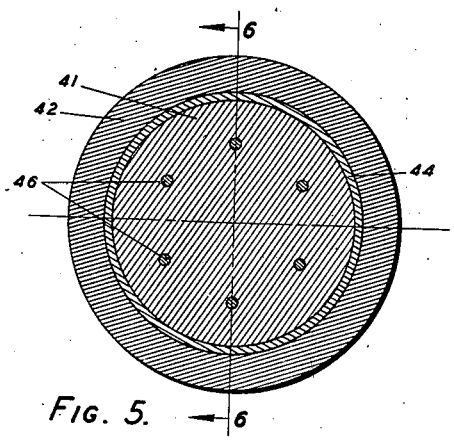
Fig. 5 is a cross section, taken substantially on broken line 5—5 of Fig. 6, showing still another form of this dynamic rectifier.
Figure 6:
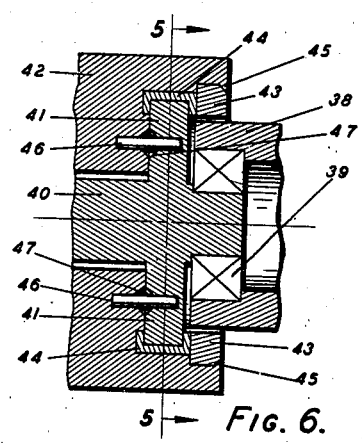
Fig. 6 is a longitudinal medial section, taken substantially on broken line 6—6 of Fig. 5, parts being broken away.

Figs. 5 and 6 show another form of the invention in which the heat fusible means is separate from the readily deformable means but serves to prevent deformation of the readily deformable means at ordinary operating temperatures. Figs. 5 and 6 show a stator 38 forming a race for bearings 39 which rotatably support an inner member 40 of a rotor. The inner rotor member 40 has an external flange 41 that extends into a suitable recess formed by two outer rotor members 42 and 43, which recess is filled with heat fusible material 44 that surrounds and embeds the peripheral portion of the flange 41 and rigidly connects the inner and outer parts of the rotor at ordinary temperatures. Rotor parts 42 and 43 are preferably secured together by crimping a portion 45 of rotor member 42 over rotor member 43.

Permanently deformable members 46, shown as dowel pins, connect the flange 41 with the outer rotor member 42 at locations axisward from the heat fusible material. The contacting faces of the flange 41 and rotor member 42 are provided with countersunk or relieved portions 47 at the locations of the deformable members 46 to leave portions of the deformable members unsupported and free to be deformed.

Figure 7:
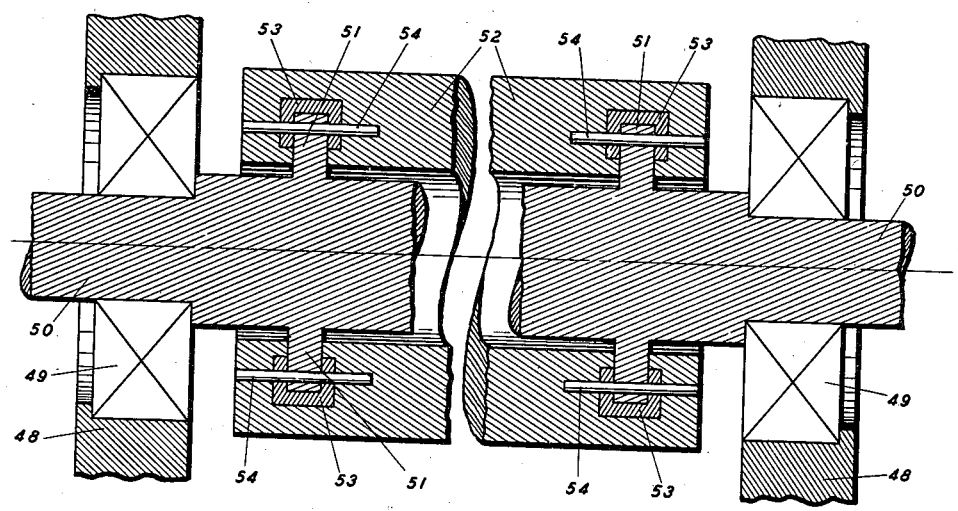
Fig. 7 is a longitudinal medial section, with parts broken away, showing still another form of dynamic rectifier constructed in accordance with this invention.

Fig. 7 shows still another form of the invention comprising stator means 48, bearings 49, inner rotor member 50 journaled in the bearings 49, and external flanges 51 on inner rotor member 50 positioned in suitable recesses in an outer rotor member 52 and connected with the outer rotor member 52 by heat fusible material 53 and permanently deformable members 54. In the form of this invention disclosed in Fig. 7 a bearing is shown at each end of the rotor. It will be understood that two bearings may be similarly provided in connection with the rotors disclosed in Figs. 1 to 6. Also it will be understood that a single bearing is sufficient for the mounting of some rotors, depending on the shape and size of the rotor. It will be understood that any one of the rotors herein shown may be any desired rotatable machine part.

Figure 8:
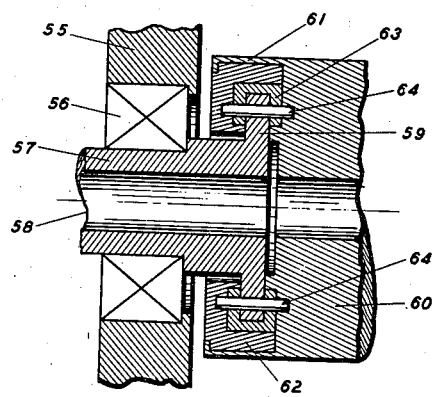
Fig. 8 is a longitudinal medial section of another form of the invention, parts being broken away.

It is sometimes desirable to use the fusible metal in structures of this type for a liquid seal, as illustrated in Fig. 8. Said Fig. 8 shows another form of the invention including stator means 55, bearing means 56 and a rotor member 57 having an axial bore 58 therein for the circulation of fluid. An external flange 59 on the rotor member 57 is positioned in a suitable recess in another rotor member. This other motor member comprises a main rotor part 60 having a counterbored end portion 61 that fits over and is clinched around an end part 62. The recess in which the flange 59 is positioned is wider than said flange, as hereinbefore explained, and is filled with fusible material 63. Permanently deformable members 64 extend through the flange 59 and fusible metal 63 and are embedded in the rotor parts 60 and 62.

In this type of construction fluid in the axial bore 58 tends to escape between the face of the flange 59 and the end of the rotor part 60. In a high speed rotor this tendency is very much increased by centrifugal force. The heat fusible material forms an efficient fluid seal between the flange 59 and part 60 and obviates this danger of leakage.

The operation of all forms of the invention herein shown is similar. In each form the heat fusible material holds the rotor parts that it connects relatively immovable and prevents deformation of the deformable members when this heat fusible material is in a solid state. To rectify the dynamic balance of the rotor said rotor is mounted in the bearings as shown and is rotated at a high speed at which the vibrations of the rotor are in dissonance with, or opposed to, the vibrations of the stator and bearing means. When this speed of dissonance has been attained heat is applied to the rotor to melt or soften the heat fusible material leaving the permanently deformable members to withstand the pounding due to the opposed vibrations. Heat to melt the fusible metal may be applied to the rotating rotor by directing the flame of a blow torch onto said rotating rotor. As rotation at this speed is continued the permanently deformable members will be deformed by the hammering of the vibrations to provide better dynamic balance. After the rotor has been balanced, as nearly as possible for the first rotary speed the heat fusible material will be allowed to set, the rotor will then be speeded up to the next period of dissonance the heat fusible material again softened or fused and the rotor again caused to seek a better state of dynamic balance. This operation will be repeated as many times as necessary, each time bringing the rotor closer to a perfect state of dynamic balance. Normally when the rotor has been dynamically balanced at a period of dissonance above the speed at which the rotor is to operate the balance will be substantially correct.

The heat fusible material prevents deformation of the deformable members under all normal operating conditions and may be used during the balancing operation to prevent their deformation at all speeds except the speeds of dissonance.

Having described my invention what I claim as new and desire to protect by Letters Patent is:

1. In a dynamically self balancing structure, relatively adjustable parts, heat fusible means rigidly connecting said parts at normal operating temperatures, and permanently deformable means adjustably connecting said parts and held rigid by said heat fusible material at normal operating temperatures.

2. A dynamically self balancing structure comprising a multiple part rotor, heat responsive means capable of being softened by heat rigidly connecting parts of said rotor at normal operating temperatures, and permanently deformable means held rigid by said heat responsive means at normal operating temperatures and adjustably connecting the said parts of said rotor when said heat responsive means is softened by heat.

3. A dynamically self balancing structure comprising a multiple part rotor, heat fusible means rigidly connecting parts of said rotor at normal operating temperatures, and permanently deformable means held rigid by said heat fusible means at normal operating temperatures and adjustably connecting said parts of said rotor when said heat fusible means is fused by heat.

4. A dynamically self balancing structure comprising a multiple part rotor, heat fusible means rigidly connecting parts of said rotor at normal operating temperatures, permanently deformable means held rigid by said heat fusible means at normal operating temperatures and adjustably connecting said parts of said rotor when said heat fusible means is fused by heat, and bearing means for said rotor positioned substantially in the plane of said heat fusible means and said permanently deformable means.

5. A dynamically self balancing structure, comprising a multiple part rotor, heat fusible material rigidly connecting parts of said rotor at normal operating temperatures, permanently deformable means held rigid by said heat fusible material at normal operating temperatures and adjustably connecting said parts of said rotor when said heat fusible material is fused by heat, and supporting and bearing means rotatably supporting said rotor and having a natural period of vibration, whereby when said heat fusible material is in a softened condition and said rotor is subjected to high speed rotation at a speed at which the period of vibration of the rotor, due to dynamic unbalance, is in dissonance to the natural period of vibration of the supporting and bearing means said permanently deformable material will be deformed to improve the dynamic balance of the structure.

6. A dynamically self balancing structure comprising an inner rotor part, an outer rotor part dynamically adjustable relative to said inner rotor part, heat fusible means rigidly connecting said inner and outer rotor parts at normal operating temperatures, and permanently deformable means held rigid by said heat fusible means at normal operating temperatures and dynamically adjustably connecting said inner and outer rotor parts when said heat fusible means is softened by the application of heat.

7. A dynamically self balancing structure comprising a multiple part rotor having parts thereof dynamically adjustable relative to other parts, recesses in some of said parts, protruding members on other parts extending into said recesses and having clearance from the walls of said recesses, permanently deformable means connecting the recessed parts with the protruding members and positioned partially within the recesses, and heat fusible material within said recesses around said protruding members and said permanently deformable means connecting the recessed rotor parts with the parts carrying the protruding members at normal temperatures, said permanently deformable means providing for dynamic adjustment when said heat fusible metal is fused by application of heat to the bearing.

8. A dynamically self balancing structure comprising an outer tubular rotor part having an annular groove in the inner wall thereof, an inner rotor part within said outer rotor part having an annular flange positioned within the groove in said outer part, said inner and outer rotor parts being relatively adjustable, pins of permanently deformable material extending transversely of said groove through said flange and adjustably connecting said outer and inner rotor parts, and heat fusible material within said groove around said flange and said pins rigidly connecting said two rotor parts, said permanently deformable pins providing for dynamic adjustment by rotation when said heat fusible metal is fused by application of heat.

9. A dynamically self balancing structure comprising a multiple part rotor, a fluid passageway extending from one part to another of said rotor, permanently deformable means adjustably connecting the parts of said rotor within which said fluid passageway extends, and heat fusible means rigidly connecting said parts of said rotor providing a fluid seal between said parts and rigidly supporting said permanently deformable means at normal operating temperatures.

10. The method of providing a dynamically balanced rotatable machine structure formed of a plurality of relatively dynamically adjustable parts, which comprises connecting parts of said structure by permanently deformable means held rigid and non-deformable at normal temperatures by heat fusible material, and dynamically balancing the structure by rapidly rotating the same while maintaining the heat fusible material in a softened condition by the application of heat.

11. The method of providing a dynamically balanced rotary machine structure formed of a plurality of relatively dynamically adjustable parts, which comprises connecting said relatively adjustable parts by permanently deformable means held rigid at normal operating temperatures by heat fusible material, supporting said rotatable machine structure in supporting and bearing means having a natural period of vibration, and deforming said permanently deformable means to rectify the dynamic balance of the structure by maintaining the heat fusible material in a plastic condition while rapidly rotating said machine structure for a substantial period of time at a speed at which the vibration of said rotating machine structure, due to dynamic unbalance, is in dissonance with the vibration of the supporting and bearing means.

12. The method of providing a dynamically balanced rotary machine structure formed of a plurality of relatively adjustable parts, which comprises connecting said relatively adjustable parts by permanently deformable means and by heat fusible means, said heat fusible means holding said rotor parts and said permanently deformable means rigid at normal operating temperatures, supporting said rotatable machine structure in supporting and bearing means having a natural period of vibration, applying heat to soften said heat fusible means, and deforming said permanently deformable means to provide dynamic balance by maintaining the heat fusible means in a softened condition while rapidly rotating said machine structure for a substantial period of time at a speed at which the vibration of said machine structure, due to dynamic unbalance, is substantially neutralized by the vibration of the supporting and bearing means.

13. The method of providing a dynamically balanced rotary machine structure formed of a plurality of relatively dynamically adjustable parts, which comprises connecting parts of said structure by permanently deformable means, holding said permanently deformable means and said relatively adjustable parts rigid and non-deformable at normal operating temperatures of the structure by heat fusible material, supporting said rotatable machine structure in supporting and bearing means having a natural period of vibration, deforming said permanently deformable means to rectify the dynamic balance of the structure by maintaining the heat fusible material in a softened condition while rapidly rotating said machine structure for a substantial period of time at a speed at which the vibration of said rotating machine structure, due to dynamic unbalance, is in dissonance relative to the vibration of the supporting and bearing means, then cooling the fusible material and repeating the balancing process one or more times each time increasing the speed of rotation of the machine structure to a higher period of dissonance, applying heat to soften the fusible material, rotating for a substantial period of time at this higher period of dissonance to further rectify the balance and cooling the fusible material.

FRANK ELLISON BEST.